US006109624A

United States Patent [19]

Message et al.

[11] Patent Number: 6,109,624

[45] Date of Patent: Aug. 29, 2000

[54] WHEEL ASSEMBLY FOR IN-LINE SKATE WITH DEVICE FOR DETECTING ROTATIONAL SPEED

[75] Inventors: Olivier Message, Tours; Franck Landrieve, Fondettes, both of France

[73] Assignee: SKF France, France

[21] Appl. No.: 09/212,470

[22] Filed: Dec. 16, 1998

[30] Foreign Application Priority Data

Dec. 18, 1997 [FR] France .................................. 97 16068

[51] Int. Cl.[7] .................................................... A63C 17/26

[52] U.S. Cl. .......................... 280/11.22; 280/809; 73/493

[58] Field of Search ................................ 280/809, 11.22, 280/11.23, 11.27; 73/493, 494; 324/160–166, 173, 174

[56] References Cited

U.S. PATENT DOCUMENTS

| | | | |
|---|---|---|---|
| 5,580,093 | 12/1996 | Conway . | |
| 5,721,539 | 2/1998 | Goetzl | 340/870.3 |
| 5,821,422 | 10/1998 | Ouchi | 73/514.39 |
| 5,929,335 | 7/1999 | Carter | 73/493 |

FOREIGN PATENT DOCUMENTS

| | | |
|---|---|---|
| 0531924A | 3/1993 | European Pat. Off. . |
| 0745778A | 12/1996 | European Pat. Off. . |
| 297 08 535 U | 8/1997 | Germany . |
| WO9304745A | 3/1993 | WIPO . |

*Primary Examiner*—J. J. Swann
*Assistant Examiner*—L. Lum
*Attorney, Agent, or Firm*—Smith, Gambrell & Russell

[57] ABSTRACT

Device for detecting the rotational speed of a wheel of an in-line skate, the wheel being supported by rotating rings of two rolling bearings with fixed rings 9 of the two rolling bearings being secured to an axle mounted on a plate. The detection device includes a sensor and an encoder which are arranged in a volume bounded axially by the two rolling bearings and radially by a cylindrical surface which is coaxial with the rolling bearings and has a diameter represented by the external diameters of the outer rings of the rolling bearings.

23 Claims, 5 Drawing Sheets

136
20
36
39
38
37
16
1
1

32
31
30
35
16
38
34
36
37
33
39

WHEEL ASSEMBLY FOR IN-LINE SKATE WITH DEVICE FOR DETECTING ROTATIONAL SPEED

FIELD OF THE INVENTION

The present invention relates to the field of in-line roller skates, a device for detecting the rotation of the wheels being provided.

BACKGROUND OF THE INVENTION

In general, the wheels of in-line skates are mounted one behind the other on the side edges of a plate secured to a boot. Each wheel is mounted so that it can rotate on a fixed axle by means of two rolling bearings, the said axle being secured by its ends to the edges of the plate.

The document DE-U-297 08 535 relates to in-line skate devices equipped with instrumentation. The back wheel of a skate is equipped with an encoder which moves in rotation past a sensor secured to a non-rotating part of the skate. The signal is processed and broadcast wirelessly to a display bracelet located on the skater's wrist. However, since the wheels are level with the ground, the device for detecting rotational speed is particularly exposed to different kinds of contamination by water, mud and other dirt. The skates are also subject to frequent impacts caused by the skater's falling, jumping curbs, etc. The aforementioned document does not discuss this subject.

SUMMARY OF THE INVENTION

The object of the invention is therefore to solve the problem of protecting the sensor/encoder combination which arises in this type of assembly.

The invention also relates to a device for detecting rotational speed in which the elements containing the sensor means and the encoder means are substituted for original elements or are mounted on original elements without requiring any modification to the wheel or the original parts remaining in the wheel assembly.

A conventional skate can therefore be equipped with a detection system according to the invention with ease by the user, without requiring particular skill or special tools.

The device for detecting the rotational speed of a wheel, according to the invention, is intended for an in-line skate. The wheel is supported by rotating outer rings of two rolling bearings. Fixed inner rings of the two rolling bearings are secured to an axle mounted on a plate. The detection device comprises a sensor means and an encoder means which are arranged in a volume bounded axially by the two rolling bearings and radially by a cylindrical surface which is coaxial with the rolling bearings and has a diameter equal to the external diameters of the outer rings of the rolling bearings. The encoder is thus in an enclosure perfectly protected from the outside environment. The detection device can be fitted readily on a standard in-line skate, previously without detection means, by simple interchanging of the elements or by mounting extra elements requiring no modification to the original parts of the skate. The detection device is therefore very easy to use. The encoder may be integrated in an encoder-support block secured to a rotating ring of a rolling bearing, or a fixed element.

In one embodiment of the invention, the encoder means is mounted on a fixed element of the wheel assembly.

BRIEF DESCRIPTION OF THE DRAWINGS

In another embodiment, the encoder means is mounted on a rotating element of the wheel assembly. The encoder means may be mounted on a ring of one of the rolling bearings, for example in place of a sealing component. The encoder means may be mounted in contact with the bore of the wheel.

The encoder means may be secured to a bracing element which is in the form of a sleeve surrounding the axle and supporting the inner rings of the rolling bearings.

In one embodiment of the invention, the detection device comprises a sensor means which is arranged facing the encoder means and is secured to a fixed element of the wheel assembly, when the encoder means is secured to a rotating element, and secured to a rotating element when the encoder means is secured to a fixed element of the wheel assembly. The sensor means may be arranged in a housing formed in the axle and may comprise a transmitter arranged at one end of the said axis. As a variant, the sensor means may be arranged in a block mounted on a ring of one of the rolling bearings, or on the axle between the two rolling bearings, or in the bore of the wheel. The sensor means may be in contact with radial surfaces of the two rolling bearings. Advantageously, the sensor means comprises a transmitter arranged in the block.

In order to power the transmitter, a battery or a rotating generator may be provided.

The sensor means and the encoder means may be fitted while preserving the original structure and shape of the wheel.

The invention also relates to an in-line roller skate equipped with such a detection device.

A skate is thus provided whose detection device is particularly well protected against external contamination and impacts and whose wheels can be changed while preserving the same detection device, which may even be mounted on a skate which did not originally have one.

Figure 1:
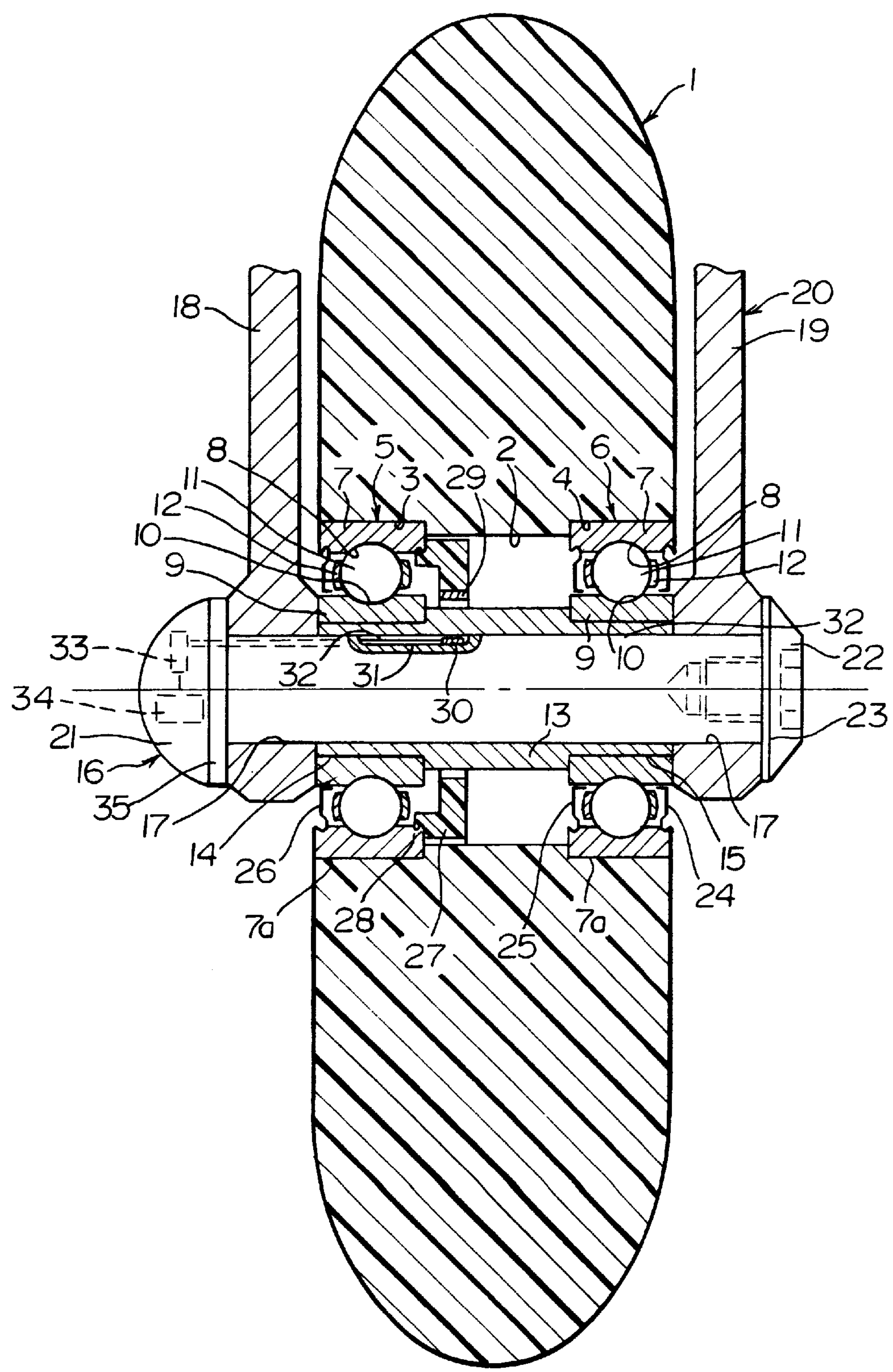
Figure 2:
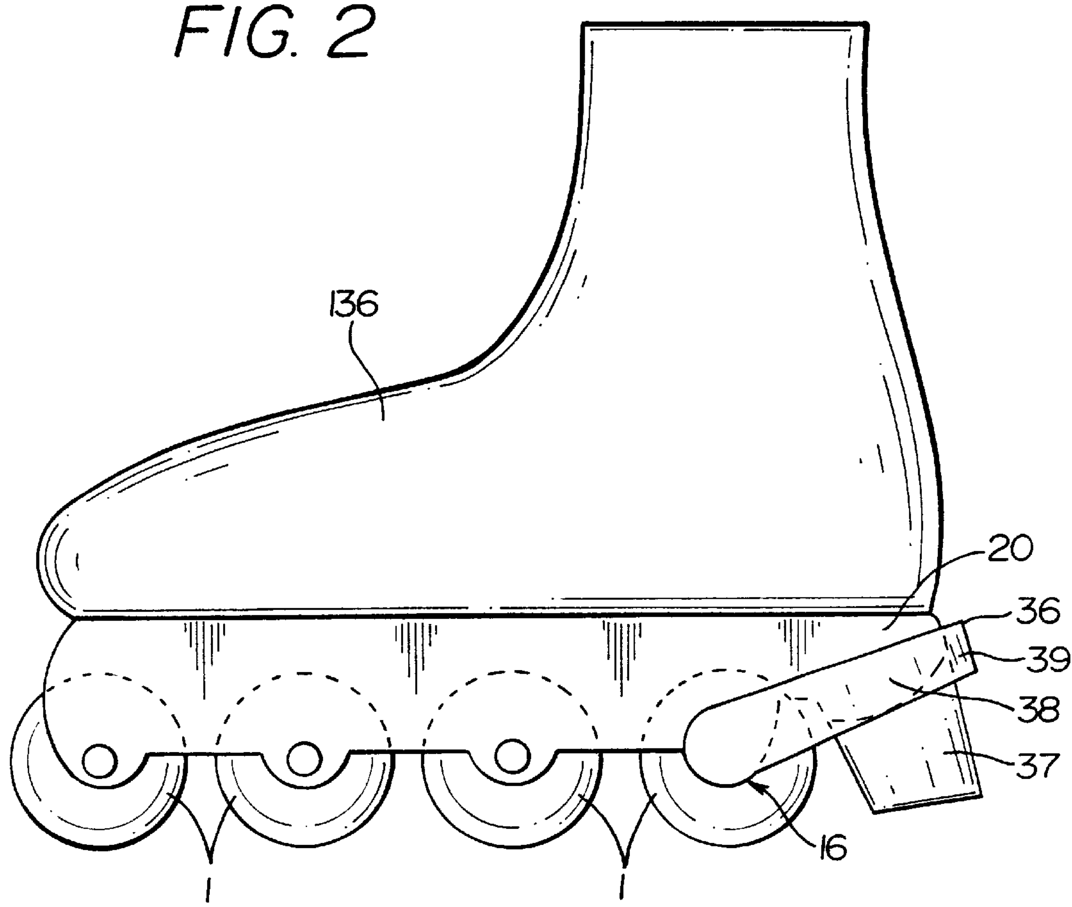
Figure 3:
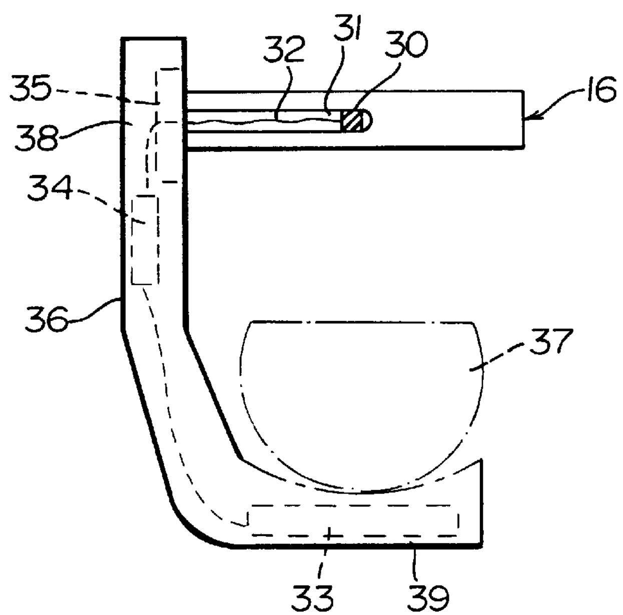
Figure 4:
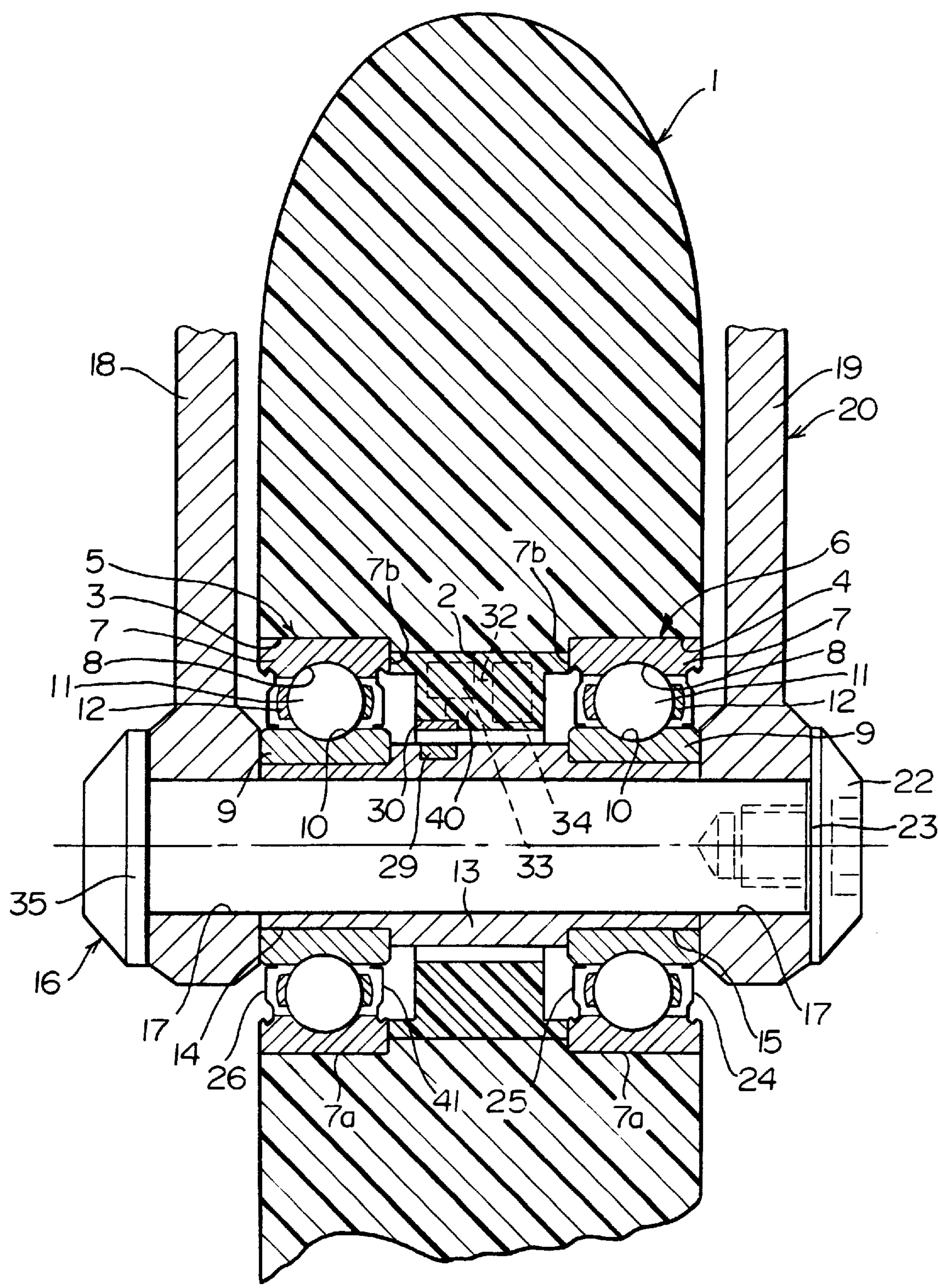
Figure 5:
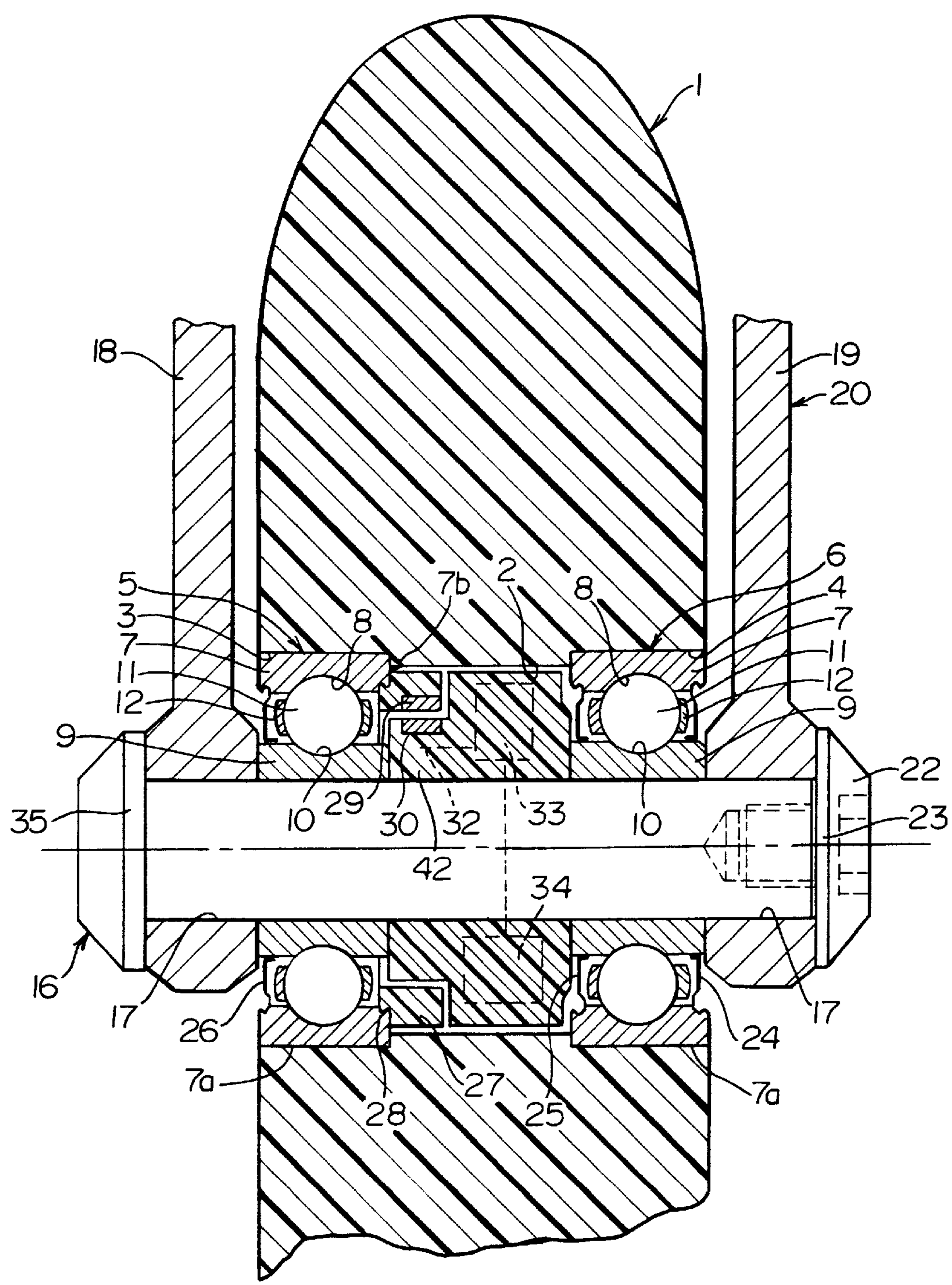
Figure 6:
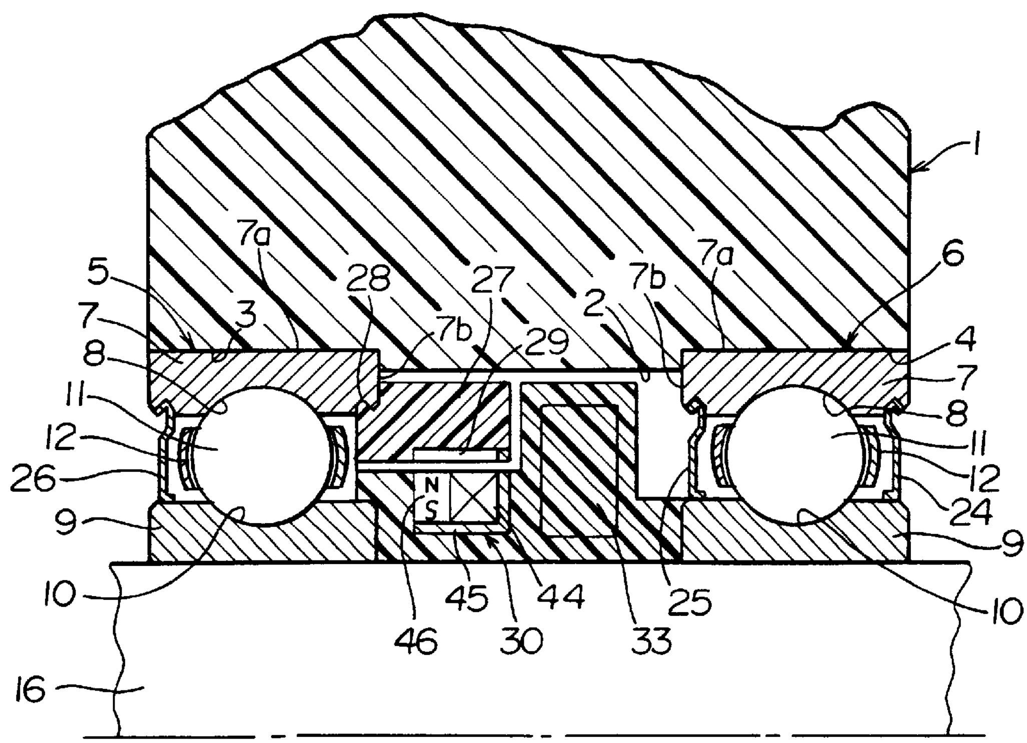
Figure 7:
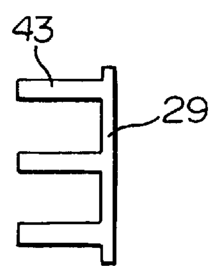

The present invention will be understood more clearly on studying the detailed description of a few embodiments which are taken by way of entirely non-limiting examples and are illustrated by the appended drawings, in which:

FIG. 1 is a view in axial section of a wheel of an in-line skate equipped with a detection device according to the invention;

FIG. 2 is a schematic side view of a skate;

FIG. 3 is a plan view of the axle used in the skate in FIG. 2;

FIG. 4 is a similar view to FIG. 1 of a skate according to another embodiment of the invention;

FIG. 5 is a similar view to FIG. 1 of a skate according to another embodiment of the invention;

FIG. 6 a similar view to FIG. 1 of a skate according to another embodiment of the invention; and FIG. 7 is a developed view of the encoder in FIG. 6.

DETAILED DESCRIPTION OF THE INVENTION

As can be seen in FIG. 1, the wheel 1 of an in-line skate is provided with a bore 2 which is extended at each end by a shouldered cylindrical mount 3 and 4 for the rolling bearings 5 and 6. The two mounts 3 and 4 are concentric with the axis of rotation of the wheel and have the same diameter, greater than that of the bore of the wheel 1. The rolling bearings 5 and 6 are identical, and comprise a rotating outer ring 7 provided with a race 8, a non-rotating inner ring 9 provided with a race 10, and a row of rolling elements 11, for example balls, which are arranged between the race 8 and the race 10 and are kept spaced apart in the circumferential direction by a cage 12.

The outer ring 7 of each rolling bearing is mounted, by means of its cylindrical outer surface 7*a*, in the corresponding cylindrical mount 3 or 4 of the wheel 1. The wheel 1 is monobloc, with the bore 2 and the rolling surface belonging to the same part.

The inner rings 9 of the rolling bearings 5 and 6 are supported by a bracing element 13, in the form of a sleeve, provided at each end with a shouldered cylindrical mount 14 and 15 for the rolling bearings 5 and 6. The bracing element 13 is secured to an axle 16 protruding from the two sides of the bracing element 13 and of the wheel 1. The portions of the axle which protrude from the bracing element 13 pass through the bores 17 provided in each edge 18 and 19 of a plate 20. The axle 16 is held in place, on one side, by a round head 21 and, on the other side, by a screw 22 which has been screwed to the end of the axle 16 and which is provided with a wide head 23, with a diameter greater than that of the bore 17 of the edge 19 of the plate 20, and bearing against a radial surface of the said edge 19, thus locking the axle 16.

The rolling bearing 6 is provided on each side of the row of rolling elements 11 with seals 24 and 25. The seal 24 is arranged on the outer side, while the seal 25 is arranged on the inner side and faces the rolling bearing 5.

The rolling bearing 5 is also provided with an outer seal 26, but does not have an inner seal. This is because it is replaced by an encoder-support block 27, made of synthetic material, secured to the rotating outer ring 7 of the rolling bearing 5 in exactly the same way as the seal 26, that is to say by engaging in a groove 28 of the outer ring 7 close to the race 8.

An encoder 29, supported by the encoder-support block 27, is arranged radially at a short distance from the bracing element 13. The encoder 29 is thus arranged axially between the rolling bearings 5 and 6, inside a volume bounded radially by the outer surfaces 7*a* of the outer rings 7 and the bore of the inner rings 9. The encoder-support block 27 is not in contact with the bore 2 of the wheel 1, which facilitates the fitting of the rolling bearing 6, provided with its encoder-support block 27, in the wheel 1, or the reverse disassembly operation.

A sensor 30 is arranged secured to a fixed part of the skate, facing the encoder 29 and radially inside the latter. If the encoder 29 is of the magnetic type, a magnetosensitive sensor 30 is used, for example a Hall probe. The sensor 30 is arranged in a groove 31 formed axially in the axle 16. The groove 31 is arranged on the cylindrical outer surface of the axle 16, and extends axially between the head 21 of the axle 16 and substantially the level of the encoder 29, so as to arrange the sensor 30 in the same radial plane as the encoder 29.

The bracing element 13 will be made of a non-magnetic material in order to allow the magnetic field lines to pass freely between the sensor and the encoder.

The sensor 30 is joined by a connection cable 32 arranged in the groove 31, to a transmitter 33 which is housed in the round head 21 of the axle 16 and is powered by a battery 34, also arranged in the round head 21. The transmitter 33 is capable of broadcasting the signal transmitted by the sensor 30 to a receiver which may be worn by the skater himself, for example on the wrist, or alternatively located on a fixed station beside a skating track. The battery 34 serves to power not only the transmitter 33 but also the sensor 30, if the latter is of the active type. The head 21 of the axle 16 may be made of plastic moulded over a disc 35 forming a flat head of the axle 16.

It is very easy to equip an original wheel with a device for detecting rotational speed. All that needs to be done is to replace the axle and one of the original roll-bearings with the axle 16 and the roll-bearing 5 according to the invention, respectively possessing the sensor means and the encoder means. The original bracing element will be changed only in the event that it is not made of magnetic material. The wheel 1 fully retains its original structure and shape.

FIG. 2 schematically represents an in-line skate comprising a boot 136 resting on a plate 20 which is equipped with four wheels 1 which have axles that are parallel and aligned and are arranged in the same equatorial plane. The back wheel 1 is equipped with an axle 16 of a type slightly different from that in FIG. 1.

The axle 16 (see also FIG. 3) is extended beyond the disc 35 by an arm which is made of plastic moulded over the said disc 35. The arm 36 extends to the rear of the skate while rising slightly and bears on and behind a brake heel 37 which is arranged to the rear of the wheels 1 and allows the skater to brake. The arm 36 thus comprises a first portion 38, extending towards the rear, and a transverse second portion 39, extending from the free end of the first portion 38 and coming into contact with the brake heel 37. Such an axle makes it possible to arrange more space to house the transmitter 33 and the battery 34, and is designed for broadcasting with a longer range than the broadcasting obtained with the configuration illustrated in FIG. 1.

In the embodiment illustrated in FIG. 4, the wheel 1 has an identical structure to that in FIG. 1, but the encoder 29 is secured to the bracing element 13 and is flush with an outer cylindrical surface of the bracing element 13, between the two rolling bearings 5 and 6. The sensor 30 is supported by a sensor-support block 40 and is arranged radially facing, and at a short distance from, the encoder 29. The sensor-support block 40 is produced radially of synthetic material and is in contact with the bore 2 to the wheel 1 and with the inner radial front surfaces 7*b* of the rotating outer rings 7 of the rolling bearings 5 and 6. The transmitter 33 and the battery 34 are integrated in the sensor-support block 40.

Once again, it is extremely easy to equip one of the wheels 1 with a device for detecting rotational speed. All that needs to be done is to remove the original rolling bearings 5 and 6 and remount them (or remount new roll-bearings) after the annular block 40, comprising the sensor 30, the transmitter 33 and the battery 34, has been arranged in the bore 2 of the wheel 1 and after the original bracing element has been replaced by a bracing element 13 possessing an encoder 29 such as a magnet.

The wheel 1 does not undergo any modification, and fully retains its original structure and shape. Of course, in this embodiment the rolling bearing 5 is provided with two seals 26 and 41. The sensor/encoder combination is arranged in a cylindrically shaped volume which has a smaller radial dimension than that bounded by the cylindrical outer surfaces 7*a* and is centred on the axis of the rolling bearings.

In the embodiment illustrated in FIG. 5, the wheel 1 has an identical structure to that in FIG. 1. The rolling bearings 5 and 6 are directly mounted on the axle 16. The encoder-support block 27 is close to that in FIG. 1, with the only exception that its dimensions have been reduced slightly. The sensor-support block 42 is mounted on the axle 16 and is placed axially in contact with the inner rings 9 of the rolling bearings 5 and 6, for which it fulfils the role of an axial bracing element. The sensor-support block 42 also includes the transmitter 33 and the battery 34.

The embodiment illustrated in FIGS. 6 and 7 is close to the previous one, apart from the fact that the encoder 29 has the form of a cone whose teeth 43 move in rotation past the sensor 30, the encoder 29 being made of magnetic material.

The sensor/encoder combination is of the passive type and comprises a fixed sensor possessing an annular winding 44 wound on the axial branch of a flux concentrator 45 with L-shaped cross-section produced with a magnetic material, the said winding bearing axially against the radial branch of the said concentrator, magnets 46 (or a multipole magnetized ring) being arranged axially against the winding 44 and around the axial branch of the concentrator 45.

The teeth 43 move in rotation past the poles of the magnets 46 and around the winding 44 of the sensor 30. As the encoder 29 rotates, the poles of the magnets 46 are either in front of the teeth 43 of the comb or between two teeth of the comb. In the first case, the magnetic-field lines close around the winding 44 while describing a closed circuit between the magnet 46, the encoder 29 and the flux concentrator 45, returning to the magnet 46. In the second case, the flux lines do not close around the winding 44 because they are not channelled by the teeth of the comb.

The variations in the magnetic fields thus created induce a current in the coil 44, whose frequency is proportional to the rotational speed of the encoder 29. The signal, in the form of an electric current, can then be used both for speed information and for generating power intended for the transmitter 33. This embodiment does not therefore need an electrical supply battery since it is the sensor/encoder combination which functions as an electricity generator, the stator of which consists of the sensor and the rotor of which consists of the encoder. The sensor 30 and the associated transmitter 33 are housed in an annular block 47 secured to the fixed ring 9 of the roll-bearing 5, the encoder combination being secured to the rotating ring 7 (a reverse arrangement—sensor block rotating and encoder combination fixed—is possible).

One of the wheels of a skate can be equipped with a device for detecting rotational speed simply by replacing one of the rolling bearings and the original bracing element, respectively, by the roll-bearing 5 provided with the encoder-support block 27 and by the sensor-support block 42.

Once more, the wheel fully retains its original structure and shape.

Thus, by virtue of these various embodiments of the invention, any wheel on a skate can be readily equipped with a device for detecting the rotational parameters of the wheel. These embodiments do not, of course, imply any limitation. Other types of sensors could be used. The invention provides a system for detecting rotational speed which is inexpensive and highly reliable by virtue of the excellent protection of the device inside a closed space formed by the bore of the wheel, the axle and the two rolling bearings.

Furthermore, mounting the device is particularly easy and can be done simply by exchanging or adding elements requiring no modification to the wheel or original parts remaining in the wheel assembly.

Finally, the device is particularly compact.

What is claimed is:

1. Device for detecting the rotational speed of a wheel of an in-line skate, the wheel being supported by rotating outer rings of two rolling bearings having fixed inner rings, the fixed inner rings of the two rolling bearings being secured to an axle mounted on a plate, said device comprising a sensor and an encoder which are arranged in a volume bounded axially by the two rolling bearings and bounded radially by a cylindrical surface, which cylindrical surface is coaxial with the rolling bearings and which cylindrical surface has a diameter represented by an external diameter of the outer rings of the rolling bearings.

2. Device according to claim 1, wherein the encoder is mounted on a fixed element of the skate.

3. Device according to claim 2, wherein the encoder is secured to a bracing element which is in the form of a sleeve surrounding the axle and supporting the inner rings of the rolling bearings.

4. Device according to claim 1, wherein the encoder is mounted on a rotating element of the skate.

5. Device according to claim 4, wherein the encoder is mounted in contact with a surface defining a bore of the wheel.

6. Device according to claim 1, wherein the encoder is mounted on a ring of one of the rolling bearings.

7. Device according to claim 6, wherein the encoder is mounted in a sealing component receptor provided in the ring of one of the rolling bearings.

8. Device according to claim 1, wherein said encoder and sensor define a sensor/encoder combination with the encoder facing said sensor and one of said encoder and sensor of said sensor/encoder combination is secured to a fixed element of the skate while an opposite one of said encoder and sensor of said sensor/encoder combination is secured to a rotating element of the skate.

9. Device according to claim 8, wherein the sensor is arranged in a housing formed in the axle and comprises a transmitter arranged at one end of the axle.

10. Device according to claim 8, wherein the sensor is arranged in a block mounted on a ring of a rolling bearing.

11. Device according to claim 10, wherein the sensor is in contact with radial surfaces of the two rolling bearings.

12. Device according to claim 8, wherein the sensor is arranged in a block mounted on the axle between the two rolling bearings.

13. Device according to claim 12 wherein the sensor is in contact with radial surfaces of the two rolling bearings.

14. Device according to claim 8, wherein the sensor is arranged in a block mounted in the bore of the wheel.

15. Device according to claim 14 wherein the sensor is in contact with radial surfaces of the two rolling bearings.

16. Device according to claim 8, wherein the sensor comprises a transmitter arranged in a block contained within said volume.

17. Device according to claim 16, wherein the sensor comprises a battery for powering the transmitter.

18. Device according to claim 8, wherein said sensor includes a transmitter and said device further comprising a rotating generator for powering the transmitter.

19. Device according to claim 18, wherein the generator is formed by the sensor/encoder combination, with one of said sensor and encoder of said sensor/encoder combination operating as a stator while an opposite one of said sensor and encoder of said sensor/encoder combination operating as a rotor.

20. Device according to claim 1, wherein the sensor and encoder are dimensioned and arranged for operational position securement with respect to an original, non-modified structure and shape of an in-line skate wheel during a retrofitting process of the in-line skate from an original state lacking a sensor encoder combination to a retrofitted state including an operational sensor/encoder combination.

21. An in-line roller skate, comprising:

a boot;

a plate secured to said boot;

a wheel supported by said plate, said wheel being in contact with two rolling bearings which two rolling bearings receive an axle supported by said plate;

a wheel speed rotation detection device comprising a sensor and an encoder which are arranged in a volume bounded axially by the two rolling bearings and bounded radially by a cylindrical surface, which cylindrical surface is coaxial with the rolling bearings and which cylindrical surface has a diameter represented by an external diameter of an outer ring of said rolling bearings.

22. An in-line roller skate as recited in claim 21 wherein said sensor includes a transmitter and a transmitter power source.

23. An in-line roller skate as recited in claim 22 further comprising an arm extending from an end of the axle and along said plate, said arm including a storage compartment for said transmitter.

* * * * *